Patented July 8, 1952

2,602,795

UNITED STATES PATENT OFFICE 2,602,795

HYDROXYALKYL ALKYL DERIVATIVES OF 5 - NITROSO- 6 -AMINO- 1,2,3,4 -TETRAHYDRO-2,4-PYRIMIDINEDIONE

Viktor Papesch, Morton Grove, and Elmer F. Schroeder, Chicago, Ill., assignors to G. D. Searle & Co., Chicago, Ill., a corporation of Illinois No Drawing. Application June 24, 1950, Serial No. 170,256

6 Claims. (Cl. 260—260)

The present invention relates to new polysubstituted heterocyclic compounds and particularly to 5 - nitroso-6-amino-1,2,3,4-tetrahydro-2,4-pyrimidinediones substituted on the nuclear nitrogen atoms by certain alkyl, cycloalkyl, hydroxyalkyl or aralkyl radicals.

The 5-nitroso-6-amino-1,2,3,4-tetrahydro-2,4-pyrimidinediones of this invention have the following structural formula:

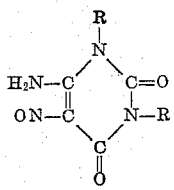

wherein the R radicals represent members of the group consisting of alkyl, cycloalkyl, hydroxyalkyl and aralkyl groups and wherein at least one of these R radicals has a molecular weight greater than 40.

Among the radicals which one of the substituents R may represent are normal and branched propyl, butyl, amyl, hexyl, cyclobutyl, cyclopentyl, cyclohexyl, benzyl, phenethyl, phenylpropyl radicals as well as hydroxy-substitution products thereof such as hydroxy-ethyl, hydroxypropyl, dihydroxypropyl and the like. The other R radical is a member of the same type or methyl or ethyl. The two R radicals may be different or identical.

We had found in the case of the 1,3-dialkyl-6-amino - 1,2,3,4 - tetrahydro - 2,4 - pyrimidinediones which are the subject of our previous application Serial No. 138,074 of January 11, 1950, that for a high degree of therapeutic and especially diuretic activity, the presence of at least one larger alkyl group was essential. Unless a group which has at least the size of a propyl group (molecular weight of 43.086) was present, these compounds were inactive. It has now been found, that exactly the same structural requirement exists in the case of the nitroso-derivatives of these compounds. Thus the 1-isopropyl-3-ethyl - 5 - nitroso - 6 - amino - 1,2,3,4 - tetrahydro-2,4-pyrimidinedione shows a strong diuretic activity by the technique of Lipschitz (Journal of Pharmacology and Experimental Therapeutics, 79:97, 1943) whereas the corresponding 1,3- diethyl compound in which the R groups have a weight of only 29.06, is quite inactive.

It is the object of this invention to provide novel chemical substances of the type described above and methods for producing the same.

It is further the special purpose of this invention to provide therapeutically active compounds. Certain of our new compounds show valuable therapeutic properties in improving cardiovascular and renal function. Such compounds also are valuable as active ingredients in parasiticidal compositions of matter.

The compounds which comprise this invention are useful as intermediates in chemical synthesis, especially of 1,3-disubstituted xanthines and pteridinoids.

The new nitroso compounds are prepared by nitrosating the corresponding 6-amino-1,2,3,4-tetrahydropyrimidinediones which are described in our applications Serial No. 138,074, filed January 11, 1950, now U. S. Patent No. 2,567,651, dated September 11, 1951, and Serial No. 172,379 filed July 6, 1950, now Patent No. 2,596,041. The nitrosation is carried out by dissolving the 6-amino - 1,2,3,4 - tetrahydro - 2,4 - pyrimidinediones in water or dilute alcohol, or by preparing a fine suspension, then adding at least one molecular equivalent of an alkali nitrite, heating to a temperature somewhat below the boiling point and acidifying. The exothermic reaction proceeds rapidly. The yield is, in most instances, almost quantitative. The nitroso compounds are usually recrystallized from water. Their color varies, as indicated hereinafter in the examples, from a light pink to a dark purple. Most of these compounds tend to decompose in the melting point tube. For purposes of identification, they were converted to the corresponding xanthine. The nitroso compound was reduced with an agent such as ammonium sulfide to the 5,6-diamino-1,2,3,4-tetrahydro-2,4-pyrimidinedione. The latter was heated with formic acid to prepare the 5-formylamino compound which was cyclized by heating for a short time with alkali to form the xanthine.

The following examples illustrate in detail certain of the compounds which comprise this invention, and methods for producing them. The invention is not to be construed as limited in spirit or in scope thereby. It will be apparent to

EXAMPLE 1

*1,3-di-n-propyl-5-nitroso-6-amino-1,2,3,4-tetrahydro-2,4-pyrimidinedione*

A solution of 22.5 g. of 1,3-di-n-propyl-6-amino-1,2,3,4-tetrahydro-2,4-pyrimidinedione in 500 ml. of water and 100 ml. of ethanol is treated at boiling temperature with mechanical stirring, first with 8.2 g. of sodium nitrite and then gradually, as the exothermic reactions permit, with 8.9 g. of glacial acetic acid. After 5 minutes of standing, the mixture is cooled and the 1,3-di-n-propyl-5-nitroso-6-amino-1,2,3,4-tetrahydro-2,4-pyrimidinedione is collected on a filter and washed with water. The reddish-purple crystals melt after recrystallization from 85% ethanol, at about 222–223° C. The structural formula of this compound is:

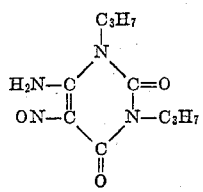

This nitroso compound is reduced with 20 g. of ammonium sulfide in a 10% aqueous solution. The mixture is heated on the steambath until the odor is no longer noticeable and the sulfur is filtered off. The 1,3-di-n-propyl-5,6-diamino-1,2,3,4-tetrahydro-2,4-pyrimidinedione is purified by repeated recrystallization from dilute alcohol. The white crystals melt at about 129–131° C. The diamino compound is boiled with a sufficient amount of an aqueous solution of formic acid to bring the pH to 2 until the 1,3-di-n-propyl-5-formylamino - 6 - amino - 1,2,3,4-tetrahydro-2,4 - pyrimidinedione begins to precipitate. Recrystallization from 10% ethanol yields a white powder which melts at 203–204° C. 150 ml. of water and sufficient 70% sodium hydroxide are added to raise the pH to 10. The solution is heated to boiling for 15 minutes, stirred with charcoal and filtered. Acetic acid is added to the filtrate to lower the pH to about 5 and, after cooling, the 1-3-di-n-propyl xanthine is collected on a filter. Several recrystallizations from 50% ethanol yield white crystals melting at about 204–206° C.

EXAMPLE 2

*1-n-propyl-3-ethyl-5-nitroso-6-amino-1,2,3,4-tetrahydro-2,4-pyrimidinedione*

A solution of 60 g. of a mixture of 90% of the 1-n-propyl-3-ethyl-6-amino-1,2,3,4 - tetrahydro - 2,4-pyrimidinedione and 10% of 1-ethyl-3-n-propyl-6-amino-1,2,3,4-tetrahydro - 2,4 - pyrimidinedione in 600 ml. water is treated with 21 g. of sodium nitrite at 75° C. 21 g. of acetic acid are added in the course of several minutes, the temperature rising to about 85° C. After 5 minutes standing, the mixture is cooled and filtered. The reddish-purple crystals, recrystallized from 1500 ml. of boiling water, melt at about 184–187° C. They consist primarily of 1-n-propyl-3-ethyl-5-nitroso-6-amino-1,2,3,4 - tetrahydro-2,4-pyrimidinedione with only a minor admixture of the 1-ethyl-3-n-propyl-isomer. This product is reduced to the 5,6-diamino compound, the latter is formylated to the 1-n-propyl-3-ethyl-5-formylamino - 6 - amino - 1,2,3,4-tetrahydro-2,4-pyrimidinedione, according to the method of Example 1. Cyclization with sodium hydroxide yields the 1-ethyl-3-n-propyl xanthine, which melts at about 175–6° C. upon recrystallization from 20% ethanol. If the pure 3-ethyl-1-propyl isomer is used, the recrystallized nitroso compound melts at about 201–203° C.

EXAMPLE 3

*1-isopropyl-3-ethyl-5-nitroso-6-amino-1,2,3,4-tetrahydro-2,4-pyrimidinedione*

A solution of 90 g. of 1-isopropyl-3-ethyl-6-amino-1,2,3,4-tetrahydro-2,4-pyrimidinedione in 1100 ml. of water is treated with 32 g. of sodium nitrite at 95° C. Addition of 32 ml. of glacial acetic acid produces no pronounced rise in temperature, an observation characteristic for the deactivating effect of a branched alkyl group in α-position to the acidic nitrogen in the pyrimidine. After 10 minutes of standing the 1-isopropyl - 3 - ethyl-5-nitroso-6-amino-1,2,3,4-tetrahydro-2,4-pyrimidinedione is collected on a filter and washed with water. The glittering dark purple crystals melt and decompose near 200° C. with gas development. Reduction by the method of Example 1 yields the 1-isopropyl-3-ethyl-5,6-diamino-1,2,3,4-tetrahydro-2,4 - pyrimidinedione which, after recrystallization from water, melts at about 62 to 64° C.

EXAMPLE 4

*1,3-di-n-butyl-5-nitroso-6-amino-1,2,3,4-tetrahydro-2,4-pyrimidinedione*

200 g. of 1,3-di-n-butyl-6-amino-1,2,3,4-tetrahydro-2,4-pyrimidinedione in 2300 ml. of water and 1400 ml. ethanol are treated with 64 g. of sodium nitrite at 80 to 82° C. 64 ml. glacial acetic acid are added as rapidly as the exothermic reaction permits. After 5 minutes of standing the mixture is cooled, filtered and washed with water. The 1,3-di-n-butyl-5-nitroso-6-amino-1,2,3,4 - tetrahydro - 2,4 - pyrimidinedione forms purple crystals. By the method of Example 1 this compound is converted first to the 1,3-di-n-butyl -5,6-diamino-1,2,3,4-tetrahydro-2,4-pyrimidinedione, then to the 1,3-di-n-butyl-5-formylamino - 6 - amino-1,2,3,4-tetrahydro-2,4-pyrimidinedione and finally to 1,3-di-n-butyl-xanthine which melts at about 189 to 191° C. after recrystallization from 55% ethanol.

EXAMPLE 5

*1-n-butyl-3-methyl-5-nitroso-6-amino-1,2,3,4-tetrahydro-2,4-pyrimidinedione*

A solution of 50 g. of 1-n-butyl-3-methyl-6-amino-1,2,3,4-tetrahydro-2,4-pyrimidinedione in 660 ml. of water is treated at 90° C., first with 16.4 g. of sodium nitrite and then with 17.7 ml. of glacial acetic acid, the temperature rising to 95° C. The purple-red compound first precipitates in amorphous aggregates. On cooling, crystals form, probably due to hydration. This 1-n-butyl-3-methyl - 5 - nitroso-6-amino-1,2,3,4-tetrahydro-2,4-pyrimidinedione is converted by the method of example 1, first to the 1-n-butyl-3-methyl-5,6-diamino - 1,2,3,4 - tetrahydro-2,4-pyrimidinedione, then to the 1-n-butyl-3-methyl-5-formylamino - 6 - amino-1,2,3,4 - tetrahydro-2,4 - pyrimidinedione and finally to 1-methyl-3-butyl xanthine, which upon recrystallization from 40% ethanol forms white crystals melting at 208 to 209.5° C.

EXAMPLE 6

*1-n-butyl-3-ethyl-5-nitroso-6-amino - 1,2,3,4-tetrahydro-2,4-pyrimidinedione*

17.2 g. of 1-n-butyl-3-ethyl-6-amino-1,2,3,4-tetrahydro-2,4-pyrimidinedione monohydrate is dissolved in 125 ml. of 20% aqueous ethanol by heating to 80° C. While the temperature is maintained at about 80 to 85° C., there are added first 5.45 g. of sodium nitrite and then 20 ml. of 30% aqueous acetic acid, dropwise, in the course of 10 minutes. A heavy purple precipitate is formed. After cooling these crystals are filtered, washed with water and dried at 80° C. They melt with decomposition at about 175 to 177° C. This nitroso compound is converted by the usual method to the 1 - n - butyl-3-ethyl-5,6-diamino-1,2,3,4-tetrahydro-2,4 - pyrimidinedione, then to the 1-n-butyl-3-ethyl-5-formylamino-6 - amino-1,2,3,4-tetrahydro-2,4-pyrimidinedione and finally to the 1-ethyl-3-n-butyl-xanthine. Recrystallization from 10 parts of 30% aqueous ethanol yields white needles which melt at about 168 to 169° C.

EXAMPLE 7

*1-isobutyl-3-methyl-5-nitroso-6-amino - 1,2,3,4-tetrahydro-2,4-pyrimidinedione*

A solution of 18 g. of 1-isobutyl-3-methyl-6-amino-1,2,3,4-tetrahydro-2,4-pyrimidinedione in 240 ml. of water is treated at 90° C. first with 5.9 g. of sodium nitrite and then with 6.4 ml. glacial acetic acid. The temperature rises to 100° C. with some gas development. After 5 minutes of standing, the mixture is cooled, filtered and washed with water. The purple 1-iso-butyl-3 - methyl - 5 - nitroso-6-amino-1,2,3,4-tetrahydro-2,4-pyrimidinedione is converted to the 1-iso-butyl-3-methyl-5,6-diamino - 1,2,3,4-tetrahydro-2,4 - pyrimidinedione, then to the 1 - iso-butyl - 3 - methyl - 5 - formylamino - 6 - amino-1,2,3,4-tetrahydro - 2,4 - pyrimidinedione and finally to 1-methyl-3-isobutyl xanthine which, recrystallized from 50% ethanol, melts at about 199 to 201° C.

EXAMPLE 8

*1 - allyl - 3 - ethyl-5-nitroso-6-amino-1,2,3,4-tetrahydro-2,4-pyrimidinedione*

A solution of 150 g. of 1-allyl-3-ethyl-6-amino-1,2,3,4-tetrahydro-2,4-pyrimidinedione in 340 ml. water is treated at 75° C. with 56 g. of sodium nitrite and then slowly with 60 ml. of acetic acid, keeping the reaction temperature at about 80° C. After standing and cooling, water is added to the crystalline suspension. The heated crystals are collected on a filter, washed and recrystallized from water. The 1-allyl-3-ethyl-5-nitroso-6-amino-1,2,3,4-tetrahydro-2,4 - pyrimidinedione forms purple crystals with a metallic sheen, which melt at about 156–158° C. This nitroso compound has the structural formula:

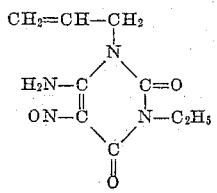

Treatment as in Example 1 yields the 1-allyl-3-ethyl - 5,6 - diamino-1,2,3,4-tetrahydro-2,4- pyrimidinedione, which is formylated to the 1-allyl-3-ethyl-5-formylamino - 6 - amino - 1,2,3,4-tetrahydro-2,4-pyrimidinedione. The latter is cyclized to the 1-ethyl-3-allyl xanthine which, upon recrystallization from water, melts at about 185 to 187° C.

EXAMPLE 9

*1-cyclohexyl-3-ethyl - 5 - nitroso - 6 - amino-1,2,3,4-tetrahydro-2,4-pyrimidinedione*

Crude 1-cyclohexyl-3-ethyl - 6 - amino-1,2,3,4-tetrahydro-2,4-pyrimidinedione containing approximately 30 g. of the pure pyrimidine is dissolved in 1500 ml. of 30% aqueous ethanol by heating to 75° C. 17.3 g. of sodium nitrite are added and, while stirring at 75 to 80° C., 60 ml. of 30% aqueous acetic acid are slowly added. After cooling the purplish precipitate is collected on a filter and washed with water. For purification the precipitate is twice stirred for several minutes at room temperature with 250 ml. of 95% ethanol, filtered and washed with 95% ethanol. The impurities are thus dissolved, leaving the 1 - cyclohexyl - 3 - ethyl-5-nitroso-6-amino-1,2,3,4-tetrahydro-2,4-pyrimidinedione as purple crystals which melt with decomposition at about 215 to 216° C. They are converted by the method of Example 1 to the 1-cyclohexyl-3-ethyl - 5,6 - diamino - 1,2,3,4 - tetrahydro - 2,4-pyrimidinedione, then to the 1 - cyclohexyl-3-ethyl- 5-formylamino - 6 - amino - 1,2,3,4-tetrahydro-2,4-pyrimidinedione and finally to the 1-ethyl-3-cyclohexyl xanthine, which forms needles melting at about 206–208° C.

EXAMPLE 10

*1,3-dibenzyl - 5 - nitroso - 6 - amino - 1,2,3,4-tetrahydro-2,4-pyrimidinedione*

181 g. of 1,3-dibenzyl-6-amino - 1,2,3,4-tetrahydro-2,4-pyrimidinedione in 1400 ml. of 60% ethanol are treated with 50 g. of sodium nitrite. The stirred solution is heated slowly to boiling and treated with 50 ml. of acetic acid, as rapidly as the exothermic reaction permits. After 5 minutes of standing, the mixture is cooled and the 1,3-dibenzyl - 5 - nitroso - 6 - amino - 1,2,3,4-tetrahydro-2,4-pyrimidinedione collected on the filter. The light pink crystals, after recrystallization from 60% ethanol, melt at about 222 to 224° C. This compound is converted by the method of example 1, first to the 1,3-dibenzyl-5,6-diamino-1,2,3,4-tetrahydro-2,4 - pyrimidinedone, then to the 1,3-dibenzyl - 5 - formylamino-6-amino-1,2,3,4-tetrahydro - 2,4-pyrimidinedione and finally to the 1,3-dibenzyl xanthine, which melts at about 214 to 215° C.

EXAMPLE 11

*1-methyl-3-(β-hydroxyethyl) - 5 - nitroso - 6-amino-1,2,3,4-tetrahydro-2,4-pyrimidinedione*

A solution of 51 g. of 1-methyl-3-(β-hydroxyethyl)-6-amino-1,2,3,4 - tetrahydro - 2,4-pyrimidinedione in 500 ml. of boiling water is nitrosated by treatment with 19 g. of sodium nitrite and 18.2 ml. of glacial acetic acid. The resulting reaction mixture is cooled and the 1-methyl-3-(β-hydroxyethyl)-5-nitroso - 6 - amino-1,2,3,4-tetrahydro - 2,4-pyrimidinedione collected on a filter, washed with water and dried. This compound has the structural formula:

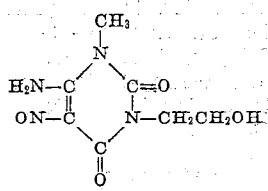

A mixture of 100 ml. of 28% ammonia water and 200 g. of ice is treated with hydrogen sulfide until 25 g. are taken up. To this solution are added 50 g. of the above nitroso compound. After the addition, the mixture is boiled for two hours, then filtered and evaporated. The residue of 1 - methyl - 3 -(β-hydroxyethyl) - 5,6 - diamino-1,2,3,4-tetrahydro-2,4-pyrimidinedione obtained by this procedure, is heated with 170 ml. of formic acid until it dissolves. The hot mixture is treated with charcoal and filtered. The filtrate is refluxed for 2½ hours and the solution is evaporated in vacuum. The hot solution is diluted with 150 ml. of hot water, treated with charcoal and filtered. 30 g. of calcium oxide are added to make the mixture strongly alkaline and the resulting solution is boiled 3½ hours. During this boiling period sufficient calcium oxide (about 10 g.) is added to maintain alkalinity. The cooled solution is brought to pH 4 with hydrochloric acid, cooled with ice, and allowed to crystallize. The crystals of 1-β-hydroxyethyl-3-methyl xanthine are removed by filtration and recrystallized from water, using activated charcoal. This compound melts at about 235 to 245° C.

EXAMPLE 12

*1-(β-hydroxyethyl)-3-methyl-5-nitroso-6-amino-1,2,3,4-tetrahydro-2,4-pyrimidinedione*

120 g. of 1 -(β-hydroxyethyl)- 3 - methyl-6-amino-1,2,3,4-tetrahydro-2,4-pyrimidinedione in 500 ml. of water are nitrosated by adding 45 g. of sodium nitrite, boiling and then adding 30 ml. of glacial acetic acid. The charge is heated for a few minutes. On chilling, a precipitate of the 1-(β-hydroxyethyl)-3-methyl-5-nitroso-6 - amino-1,2,3,4 - tetrahydro - 2,4 - pyrimidinedione forms which is collected on a filter. This compound has the following structural formula:

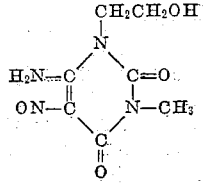

Into 224 ml. of 28% ammonium hydroxide and 450 ml. of ice is passed hydrogen sulfide until the uptake is 55 g. The solution is then heated to boiling and 112 g. of the above compound are added in small portions. This mixture is boiled for 2½ hours, then filtered with the aid of decolorizing charcoal. The filtrate is evaporated on the steam bath until nearly dry. There is obtained in this way 1-(β-hydroxyethyl)-3-methyl-5,6-diamino-1,2,3,4 - tetrahydro-2,4 - pyrimidinedione.

98.5 g. of the above compound are refluxed with 400 ml. of formic acid for 3 hours. The formic acid is then removed by vacuum distillation and the residue is taken up in about 1 liter of water. The mixture is filtered to remove sulfur and 90 g. of calcium oxide are added to the filtrate. The suspension is boiled for 2 hours. The resulting solution is made slightly acid with concentrated hydrochloric acid and a precipitate forms. The charge is chilled and filtered. The 1-methyl-3-β-hydroxyethyl xanthine is washed with water and dilute alcohol, and then recrystallized from water with the aid of decolorizing charcoal. The product thus obtained melts at about 276 to 277° C.

EXAMPLE 13

*1-(β-hydroxyethyl)-3-ethyl-5-nitroso-6-amino-1,2,3,4-tetrahydro-2,4-pyrimidinedione*

To a solution of 30 g. of 1-(β-hydroxyethyl)-3-ethyl-6-amino-1,2,3,4-tetrahydro-2,4-pyrimidinedione in 150 ml. of water, heated to 90° C., are added 10.9 g. of sodium nitrite. With stirring 40 ml. of an approximately 30% aqueous solution of acetic acid are added dropwise in a period of 10 minutes, the temperature being maintained at about 90 to 95° C. On cooling, purplish crystals of 1 -(β-hydroxyethyl)- 3 - ethyl - 5 - nitroso-6-amino-1,2,3,4-tetrahydro - 2,4 - pyrimidinedione separate. These are filtered off, washed with water and dried at 80° C. to melt with decomposition at about 172–173° C. This compound is converted by the method of Example 12 to the 1-(β-hydroxyethyl)-3 - ethyl - 5,6-diamino -1,2,3,4-tetrahydro-2,4 - pyrimidinedione, then to 1 -(β-hydroxyethyl)- 3-ethyl-5-formylamino-6-amino-1,2,3,4-tetrahydro-2,4-pyrimidinedione and finally to the 1-ethyl-3-(β-hydroxyethyl) xanthine. The sodium salt of this xanthine derivative is insoluble in water. Recrystallization of the base from water produces white crystals which melt at about 211 to 212° C.

We claim:

1. The hydroxyalkyl-alkyl-5-nitroso-6-amino-1,2,3,4-tetrahydro-2,4-pyrimidinediones of the structural formula:

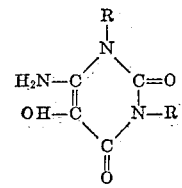

wherein one of R radicals is a lower hydroxyalkyl and the other a lower alkyl group.

2. The 1-hydroxyalkyl- 3-alkyl- 5-nitroso- 6-amino-1,2,3,4-tetrahydro-2,4-pyrimidinediones of the structural formula:

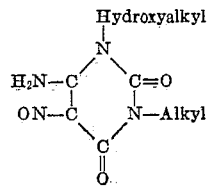

wherein the alkyl radical is a lower alkyl radical and the hydroxyalkyl radical is a lower hydroxyalkyl radical.

3. The hydroxyalkyl-alkyl-5-nitroso-6-amino-1,2,3,4-tetrahydro-2,4-pyrimidinediones of the structural formula:

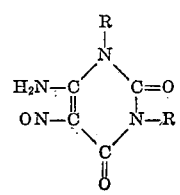

wherein one of the R radicals is a β-hydroxyethyl radical and the other is a lower alkyl radical.

4. A compound as in claim 3 wherein one R is a β-hydroxyethyl radical and the other is a methyl radical.

5. 1-(β-hydroxyethyl)-3-methyl-5-nitroso-6-amino-1,2,3,4-tetrahydro-2,4-pyrimidinedione.

6. 1-(β-hydroxyethyl)-3-ethyl-5-nitroso-6-amino-1,2,3,4-tetrahydro-2,4-pyrimidinedione.

VIKTOR PAPESCH.
ELMER F. SCHROEDER.

REFERENCES CITED

The following references are of record in the file of this patent:

Beilstein, Vierte Auflage, vol. 24, p. 515.